Patented May 15, 1951

2,553,146

UNITED STATES PATENT OFFICE 2,553,146

PRODUCTION OF VANILLIC ACID

Irwin A. Pearl, Appleton, Wis., assignor, by mesne assignments, to Sulphite Products Corporation, a corporation of Wisconsin No Drawing. Application September 13, 1946, Serial No. 696,944

4 Claims. (Cl. 260—521)

My invention relates to the processing of certain recalcitrant benzaldehydes and includes among its objects and advantages the production of desired acids and alcohols from such benzaldehydes. Certain types of benzaldehydes, specifically those substituted in 2 or 4 position with hydroxy, amino or amino with substituents which do not interfere, such as alkyl, aryl, and aralkyl groups, do not undergo the Cannizzaro reaction in hot alkaline solution.

My research has developed the unexpected result that while these aldehydes, in a strong alkali solution, will not undergo the Cannizzaro reaction, the presence of catalytic silver causes the reaction to proceed readily.

And in the case of vanillin, the resulting vanillyl alcohol may be recovered, either as a condensation dimer, or as a higher condensation polymer, by suitable processing of the mass after the reaction is completed.

An illustrative example of procedure according to the present invention is as follows:

Example I

One weight atom of finely divided metallic silver is boiled for two hours in an aqueous solution containing 5.0 mole of sodium hydroxide and one mole of vanillin.

The solution is filtered to separate the silver, and the filtrate acidified with sulfur dioxide and extracted with ether, (or other organic solvent). This ether extract contains both the vanillic acid and the polymerized vanillyl alcohol products, which are easily separated by extracting the ether with 8% sodium bicarbonate solution, which will extract the vanillic acid and leave the polymerized alcohol in the ether.

Acidification of the sodium bicarbonate solution secures the vanillic acid as a precipitate, and removal of the organic solvent by distillation secures the polymerized alcohol portion.

The yield is substantially 0.5 mole of vanillic acid, and the amount of polymerized vanillyl alcohol is slightly less than 0.5 mole by reason of the fractional loss of weight due to polymerization. However, analysis of the polymerized portion of the product gives an amount of methoxyl which is the full equivalent of 0.5 mole of alcohol.

Example II

The same filtrate secured in Example I is acidified with carbon dioxide until acid to phenolphthalein, and extracted with ether. This leaves the vanillic acid in the original solution and separates the polymerized product in the ether extract.

The procedure of Example I is preferable when operating conditions are such that there may be some vanillin still present, because the ether extraction will leave the vanillin in the aqueous solution. Where it is certain that all vanillin has been reacted, the procedure of Example II is more convenient and equally effective.

The Cannizzaro reaction is conveniently written as follows:

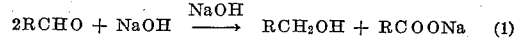

$$2\text{RCHO} + \text{NaOH} \xrightarrow{\text{NaOH}} \text{RCH}_2\text{OH} + \text{RCOONa} \quad (1)$$

It will be seen that one molecule of aldehyde is reduced and the other one oxidized to generate equal parts of the derived alcohol and the sodium salt of the derived acid, which equal parts can be readily separated.

However, the reactions taking place in Examples I and II hereinabove tend to go beyond Equation 1, at least to the extent that no vanillyl alcohol as such is found in the product. One initial polymerization which vanillyl alcohol undergoes in alkaline solution is according to the equation:

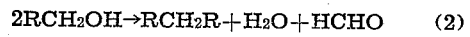

$$2\text{RCH}_2\text{OH} \rightarrow \text{RCH}_2\text{R} + \text{H}_2\text{O} + \text{HCHO} \quad (2)$$

In the case of vanillyl alcohol the compound $\text{RCH}_2\text{R}$ is a dihydroxydimethoxydiphenylmethane.

Example III

About 68 parts of silver nitrate dissolved in about 200 parts of water is first mixed with about 17 parts of sodium hydroxide dissolved in about 80 parts of water. The precipitated silver oxide is filtered and washed with water. The moist oxide is then covered with about 500 parts of water and with vigorous agitation is treated successively with about 80 parts of solid sodium hydroxide and about 116 parts of vanillin. The warm reaction mixture is heated for several minutes and then filtered. Pure silver is obtained as the precipitate. Acidification with carbon dioxide and ether extraction, as in Example II, yields about 90 parts vanillic acid and about 28 parts of polymerized material, which, when recrystallized from water, yields white needles of dihydroxydimethoxydiphenylmethane melting sharply at 108–109° C.

It will be apparent that the silver oxide present was reduced by vanillin to metallic silver, and that subsequently the remaining vanillin reacted according to Equations 1 and 2. And, in this instance, the polymerization of vanillyl alcohol is substantially arrested at the point where it has formed dihydroxydimethoxydiphenylmethane.

It will be apparent that the residual silver from Example III is available for use as in Example I indefinitely, and that Example III is a convenient way of preparing the silver for use in Example I. Catalytic silver prepared in this way has been used repeatedly in the same process without observable deterioration. Apparently its life is perpetual for continued use in the reactions of Equations 1 and 2.

*Example IV*

Catalytic metallic silver prepared as disclosed in my co-pending application, Serial No. 536,042, filed May 17, 1944, now abandoned, may be secured in an extremely finely divided form such that it has an apparent density of only 0.166 and when permitted to dry in air it heats itself spontaneously and fuses into a ball. A bed of such silver was prepared and provided with a steamjacket and suction means for drawing liquid through it, which suction means was adjusted so that the solution was in contact with the catalyst for about two to three minutes.

A solution of 3 parts of vanillin and 4.8 parts of sodium hydroxide in 100 parts of water was heated to boiling and passed through the bed. The percolate and washings were acidified with sulfur dioxide, which caused a thick precipitate. The precipitate was extracted with ether, yielding an extract of 3.1 parts of a mixture of white crystals and yellow solid. This mixture was shaken with 8% sodium bicarbonate solution and filtered. The filtrate contained 1.7 parts of vanillic acid having a sharp melting point at 210–211° C., which represented 51.1% of the vanillin originally put in. The residue amounted to 1.3 parts of polymerized vanillyl alcohol melting at 95–100° C., representing 42.7% of the original vanillin.

The effectiveness of a continuous procedure is dependent only on adequate exposure to sufficiently active material, and such silver as is secured in Example III hereinabove could also be employed for a continuous process, if given adequate depth of bed and time of exposure. It will also be apparent that the temperature to which it is preferable to heat the incoming solution will vary, depending on the activity of the bed of catalyst.

Any finished reaction mass according to any of the examples in this application, when acidified with carbon dioxide, gives an almost quantitative yield of the condensation dimer, but sulfurous and stronger acids cause the polymerization to proceed further.

*Example V*

The substitution of ortho-vanillin for vanillin in any one of Examples I to IV inclusive results in the production of one mole of the derived acid and one mole of the derived alcohol from two moles of the aldehyde.

*Example VI*

The substitution of an equivalent quantity of syringaldehyde for vanillin in any one of Examples I to IV inclusive results in producing one mole of the derived acid and one mole of the derived alcohol from two moles of the aldehyde.

*Example VII*

The substitution of an equivalent quantity of para-aminobenzaldehyde for vanillin in any one of Examples I to IV inclusive results in producing one mole of the derived acid and one mole of the derived alcohol from two moles of the aldehyde.

*Example VIII*

The substitution of an equivalent quantity of ortho-aminobenzaldehyde for vanillin in any one of Examples I to IV inclusive results in producing one mole of the derived acid and one mole of the derived alcohol from two moles of the aldehyde.

*Example IX*

The substitution of an equivalent quantity of para-dimethylaminobenzaldehyde for vanillin in any one of Examples I to IV inclusive results in producing one mole of the derived acid and one mole of the derived alcohol from two moles of the aldehyde.

*Example X*

The substitution of an equivalent quantity of salicilaldehyde for vanillin in any one of Examples I to IV inclusive results in producing one mole of the derived acid and one mole of the derived alcohol from two moles of the aldehyde.

*Example XI*

The substitution of an equivalent quantity of para-hydroxybenzaldehyde for vanillin in any one of Examples I to IV inclusive results in producing one mole of the derived acid and one mole of the derived alcohol from two moles of the aldehyde.

*Example XII*

The substitution of an equivalent quantity of 5-chlorvanillin for vanillin in any one of Examples I to IV inclusive results in producing one mole of the derived alcohol from two moles of the aldehyde.

*Example XIII*

The substitution of an equivalent quantity of 5-bromvanillin for vanillin in any one of Examples I to IV inclusive results in producing one mole of the derived alcohol from two moles of the aldehyde.

*Example XIV*

The substitution of an equivalent quantity of ortho-dimethylaminobenzaldehyde for vanillin in any one of Examples I to V inclusive results in producing one mole of the derived alcohol from two moles of the aldehyde.

In all the work with vanillin itself, as in Examples I to IV inclusive, the product of acidification with carbon dioxide is substantially entirely the condensation dimer, but acidification with sulfur dioxide carries the polymerization further and produces a mixture of the condensation dimer and substantial quantities of higher condensation polymers.

However, throughout Examples V to XIV inclusive the tendency to polymerize is greatly lessened, and in most instances I have secured the monomer even when acidifying with sulfur dioxide.

Others may readily adapt the invention for use under various conditions of service by employing one or more of the novel features disclosed, or their equivalents. This application is a continuation-in-part of my prior application Serial No. 536,040 which was filed on May 17, 1944, now abandoned.

I claim:

1. The process of producing equivalent quantities of vanillic acid and a polymer of vanillyl alcohol which comprises subjecting vanillin to the action of an aqueous reaction mixture made up of strong caustic alkali and finely divided metallic silver, acidifying the reaction mixture and recovering the vanillic acid and the polymer of vanillyl alcohol.

2. The process of claim 1 in which the reaction mixture is acidified with sulfur dioxide, the acidified reaction mixture extracted with an organic solvent and the vanillic acid and the polymer of vanillyl alcohol recovered from the resulting extract.

3. The process of claim 1 in which the reaction mixture is acidified with carbon dioxide and the vanillic acid and the polymer of vanillyl alcohol substantially in the form of the dimer of vanillyl alcohol are recovered from the acidified mixture.

4. The process of producing vanillic acid and a polymer of vanillyl alcohol which comprises reacting silver oxide with excess vanillin in a strong caustic alkali aqueous reaction mixture, reacting the resulting reaction mixture containing vanillic acid and metallic silver with the remaining excess vanillin to produce therefrom equivalent quantities of vanillic acid and the polymer of vanillyl alcohol, acidifying the reaction mixture and recovering the vanillic acid and the polymer of vanillyl alcohol.

IRWIN A. PEARL.

REFERENCES CITED

The following references are of record in the file of this patent:

UNITED STATES PATENTS

| Number | Name | Date |
|---|---|---|
| 2,414,120 | Pearl | Jan. 14, 1947 |
| 2,419,158 | Pearl | Apr. 15, 1947 |

FOREIGN PATENTS

| Number | Country | Date |
|---|---|---|
| 117,591 | Sweden | Nov. 12, 1946 |

OTHER REFERENCES

Adams et al.: Organic Reactions, vol. II, p. 95 (1944).

Adams et al.: Organic Reactions, vol. II, pp. 109–113, (1944).

Pearl: J. Am. Chem. Soc., vol. 67, p. 1628 (Sept. 1945).

Pearl: J. Org. Chem., vol. 12, pp. 79–89 (1947).